July 12, 1955  L. S. GUARINO  2,713,156
ROTOR TIP PATH PLANE INDICATOR FOR HELICOPTER
Filed Dec. 23, 1953  2 Sheets-Sheet 1
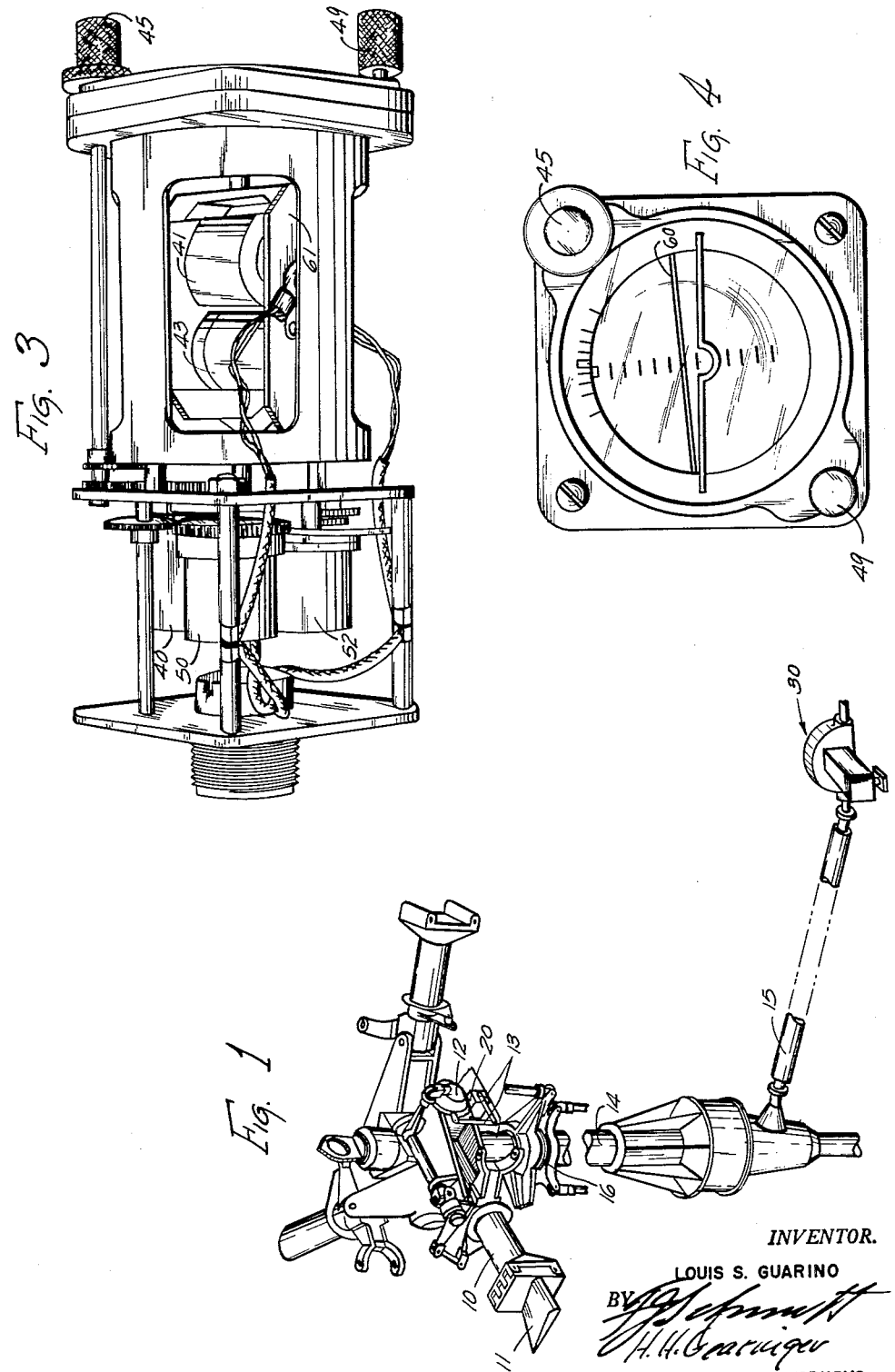
INVENTOR.
LOUIS S. GUARINO
BY
ATTORNEYS

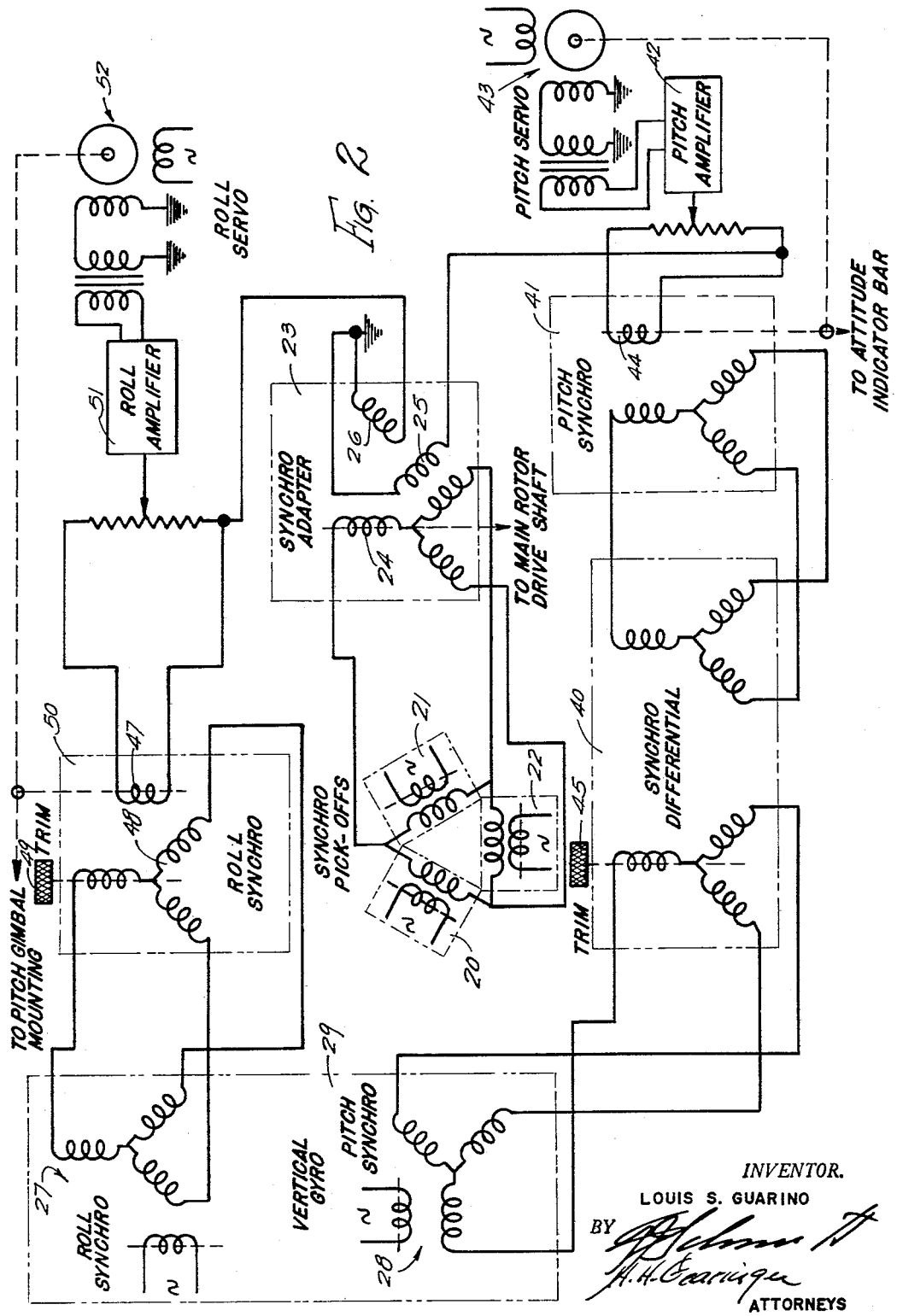

United States Patent Office 2,713,156
Patented July 12, 1955

2,713,156

ROTOR TIP PATH PLANE INDICATOR FOR HELICOPTER

Louis S. Guarino, Yeadon, Pa.

Application December 23, 1953, Serial No. 400,151

8 Claims. (Cl. 340—27)

(Granted under Title 35, U. S. Code (1952), sec. 266)

The invention described herein may be manufactured and used by or for the Government of the United States of America for governmental purposes without the payment of any royalties thereon or therefor.

This invention relates to aircraft navigational aids and specifically to a system for presenting an indication of the attitude of the tip-path plane of the main rotor blades of a helicopter.

The term "tip-path plane," as used here, refers to the plane passing through the main rotor blade-tips of a helicopter. Direction of flight and attitude of the fuselage of a helicopter and the control of those quantities can be closely correlated to the tip-path plane. In fact, instrument flight of a helicopter is possible from an indication of tip-path plane alone. Therefore, the value of an accurate and dependable indication of tip-path plane can be readily appreciated.

The pilot's control of rotor tip-path plane is by means of a cyclic pitch stick. Movement of the cyclic pitch stick is transferred through suitable linkages to control the attitude of a stationary lower wobble plate or swash plate. The upper wobble plate rotates with the rotor and is in contact with the lower plate. The effect of this is that a given point on the upper plate will move sinusoidally with respect to a horizontal reference. The cyclic pitch of the rotor blades is then controlled by suitable linkages connecting the upper wobble plate to each of the rotor blades and this cyclic pitch determines the attitude of the tip-path plane.

However, in commonly used, fully articulated, flapping-blade type rotors, the blades are also free to move and change the tip-path plane due to the influence of aerodynamic forces over which the pilot has no control. Therefore, it is often the case that actual tip-path plane differs from that which might be indicated from the setting of the control mechanism.

In addition, there is a finite time lag between a change in rotor tip-path plane and the effect of the change on fuselage attitude so that a change in tip-path plane due to aerodynamic causes cannot be detected soon enough by a fuselage attitude sensor to permit its cancellation quickly with a minimum of corrective control or to allow proper consideration of such changes in applying maneuvering controls.

In tip-path plane indicators of the prior art, attitude signals were taken from a source in the cyclic pitch stick control linkages, ignoring the effect of aerodynamic forces on the blades themselves and consequently often presenting incorrect indications. In fact, such an indicator should more properly be called a swash plate indicator rather than a tip-path plane indicator. In some installations the swash plate indication was shown in conjunction with a fuselage indication, but as was explained above, this fuselage indication is too slow to supply an adequate basis for instrument control of the helicopter or to reflect the true tip-path plane attitude.

In this state of affairs, it can be seen that a tip-path plane indicating system which is based on the physical displacement of the control mechanism, even considered in conjunction with fuselage attitude information, is of limited reliability and substantially useless by itself.

A more practical system, characterized by the instant invention, is one which derives signals directly from the rotor blades or vanes, thereby accounting for all factors which affect the tip-path plane and have an effect on the flight of the helicopter. In developing a system of this sort, several problems arise which must be solved before a practical, efficient system can be evolved. Among these problems are the means of obtaining signals from the moving vanes, the means for passing the signals from the moving rotor assembly to stationary indicating equipment and the means by which signals taken from the vanes can be employed to determine the rotor tip-path plane.

The indication sought is the attitude of a geometric plane and it is a well-known proposition that at least three points are needed to determine a plane. This means that a signal must be taken from three spaced points on the rotor assembly as it rotates in space. Since most helicopters employ a three-vaned rotor, a practical solution is to derive a signal from each of the rotor blades. A synchro pick-off is attached to a fixed part of the rotor assembly close to the flapping pivot of each blade and the rotor of the synchro connected by means of suitable linkage to its corresponding blade such that vertical swinging of the blade with respect to the helicopter fuselage will induce a proportional signal in the pick-off. The synchro signals pass through a slip-ring assembly to the stationary part of the system to a synchro adapter which acts as a commutator to synchronize the signals from the rotating blades and also separates the signals into pitch and roll components. A unique connection, to be hereinafter more fully explained, is employed from the synchro pick-offs to the synchro adapter. Fuselage attitude signals from a vertical gyroscope are added to the pitch and roll component signals to convert them to a horizon reference from a fuselage reference and the converted signals are then amplified and employed to control servo mechanisms which position a visual tip-path plane indicator.

It is an object of this invention to devise a system for presenting accurate tip-path plane information to the pilot of a helicopter.

It is also a purpose of this invention to determine the tip-path plane from signals derived directly from the rotor or rotors of a helicopter thereby eliminating errors due to the difference in actual rotor attitude and the apparent attitude indicated by the setting of control mechanism.

Another object of the invention is to teach a novel and unique means for securing signals from a plurality of spaced points on a rotating plane and conducting the signals to stationary apparatus to determine the attitude of the plane.

It is a further purpose of this invention to present tip-path plane data with reference to the horizon accounting for the effect on the rotor of aerodynamic forces acting directly on the rotor blades.

It is another object of this invention to teach the construction of a tip-path plane indicating system which will present accurate, instantaneous tip-path plane data when used with any of the known types of helicopters.

This invention has for a further object the provision of a relatively simple, accurate, tip-path plane indicating system using a minimum of parts.

Other objects and many of the attendant advantages of this invention will be readily appreciated as the same becomes better understood by reference to the following detailed description when considered in connection with the accompanying drawings wherein:

Figure 1 is an illustration of the main rotor showing the structure and approximate physical relationship of the parts of the drive shaft and rotor head and the related parts of the indicating system;

Figure 2 is an electro-mechanical schematic diagram of the system;

Figure 3 shows a physical embodiment of the indicating mechanism;

Figure 4 is a view of the indicator face.

In the drawings, mechanical connections are shown schematically by dotted lines.

Referring to Figure 1, it will be seen that pivotal movement of arm 10 and blade 11 about the bearing 12 will transmit motion to the synchro pick-off 20 through the linkage 13. An electrical signal is induced in the synchro windings proportional to the magnitude of the deviation of the rotor blade from its neutral position with respect to the rotor drive shaft 14. The same situation prevails with respect to synchro pick-offs associated with the other two blades of the rotor. To carry the signals from the synchros, which are revolving with the rotor, to the synchro adapter, which is in a stationary position inside the aircraft, a slip-ring assembly 16 is employed. A synchronizing drive shaft 15 is operatively joined to the main rotor drive shaft and drives the rotor of the synchro adapter 30 at the same speed as the main rotor, thus synchronizing the adapter with the incoming signals from the pick-offs and completing the transition from the rotating elements of the system to the stationary elements. The synchro adapter has a sine-cosine wound rotor which separates the signals into roll and pitch components which are conducted to separate pitch and roll channels.

Pitch and roll signals from a vertical gyroscope 29 are added to the corresponding pitch and roll signals developed at the synchro adapter to convert the tip-path plane signals from a fuselage base reference to a horizon base reference. To do this, the gyroscope pitch signals are fed to a synchro differential 40 where trim correction is made and then to a pitch synchro 41 that produces a signal which is added to that from the adapter. The sum signal is amplified by pitch amplifier 42 and controls the operation of pitch servomotor 43. Servomotor 43 is mechanically connected to the rotor 44 of the pitch synchro and turns said rotor to null, simultaneously positioning a suitable indicator.

Similarly, roll signals from the gyroscope are conducted to a roll synchro 50 whose rotor output is added to the roll signal from the adapter. Trim correction, if required, is introduced at the roll synchro. The sum roll signal is amplified by roll amplifier 51 whose output drives servomotor 52. The output shaft of the motor 52 is mechanically linked to the rotor of synchro 50 which is driven to null. Servomotor 52 also positions the indicating mechanism for roll indication. In practice, the pitch mechanism may be mounted on a gimbal whose rotational position is controlled by the roll mechanism.

To obtain the tip-path plane indication, it is desired to obtain voltages which will represent the orientation in space of three points which are parallel to the tip-path plane and to impress those voltages on the legs of a synchro stator winding in which the legs of the stator bear the same angular relation to each other as the three points at which the measurements are made. In the illustrated application, which is that which would be employed with a conventional three-vaned rotor, the sensors are placed 120° apart and a synchro adapter is employed which has three stator windings 120° apart. It is clear that the system can be easily modified to accommodate different types of rotors by changing the number and location of the sensors to coincide with the orientation of the rotor blades and by employing a synchro adapter whose characteristics also vary accordingly. In this connection, it should be noted that horizontal flapping of the blades of a fully articulated rotor does not impair the efficacy of the sensing system. The average angular displacement in the horizontal plane between the rotor blades over a complete revolution will be equal to 360° divided by the number of blades in a conventional equiangular rotor system and since the signal is derived over the 360° period and since the transition time of the blades through the horizontal flapping cycle is of relatively short duration, the ultimate effect detectable on the tip-path plane indicator is negligible if not actually non-existant.

Though the illustrated embodiment uses synchro type sensors, other types of signal detectors such as potentiometers or variable transformers may be employed with equally good results.

The synchro pick-offs 20, 21, and 22 are connected in delta and a delta-Y transition made to the windings of a synchro adapter 23 through the slip ring assembly 16. This places on the rotor windings 24 of the synchro adapter voltages which locate the tip-path plane with respect to the fuselage. The stator windings 25 and 26 are aligned with the roll and pitch axes respectively of the aircraft fuselage and act to separate the signal voltages into a roll component and a pitch component voltage. To these are added the roll and pitch signals from gyroscope roll synchro 27 and pitch synchro 28 to convert from a fuselage reference to a horizon reference. This means that the indication to the pilot will require no correction or interpolation but may be used directly as the basis for instrument flight or may be employed as the reference for an automatic pilot.

It will be noted that the voltage impressed on rotor 24 is dependent solely on the attitude of the tip-path plane with respect to the fuselage and is unaffected by the angular disposition of the blades. For example, if each of the blades was to flap vertically by an equal angular displacement from a given starting position, the voltage across each leg of the delta would change by the same amount so that there would be no measurable differential voltage at the points at which connections are made to the rotor 24. If, on the other hand, one of the blades should be displaced angularly by a lesser or greater amount than the other two blades, there would be a correspondingly different voltage induced in the related leg of the delta. This voltage would be detected by the synchro adapter and would ultimately cause repositioning of the indicator as required.

Signals from each of the synchro pick-offs are transferred from the revolving rotor head to stationary conductors leading to the synchro adapter by means of the slip-ring assembly 16 shown schematically in Figure 1. In order to prevent the appearance of a signal due to the rotation of the rotor blade assembly, one element of the synchro adapter is caused to turn at the same speed as main rotor drive shaft. This is accomplished through the synchronizing drive shaft 15 which is connected directly to the main rotor drive shaft. The signal on the rotor 24 of the synchro adapter is a composite of the voltage induced in each of the sensing synchros as the rotor blade tip-path plane changes in space. As was explained above, rotor 25 is aligned with the roll axis of the fuselage and rotor 26 is aligned with the pitch axis resulting in the separation of the tip-path plane signal into pitch and roll components.

A fuselage pitch signal is taken from a pitch synchro 28 in the vertical gyroscope 29 and fed to a pitch differential synchro 40. The differential 40 is in turn connected to a pitch synchro 41. Because of the physical location of the pitch synchro 41 on the gimbal mounting 61 as seen in Figure 3, differential 40 is added to provide a more accessible means for introducing trim correction into the pitch channel. Correction is made via trim knob 45. The pitch component from the synchro adapter is added to the output of rotor 44 and the resultant becomes the input signal for pitch amplifier 42. The output of the amplifier controls armature current for servomotor 43 which is mechanically linked to the rotor shaft of pitch synchro 41 and rotates said rotor to its null position simultaneously positioning indicator bar 60 on the face of the tip-path plane indicator.

A fuselage roll signal is also taken from the vertical gyroscope roll synchro 27 which is connected back to back with roll synchro 50. Trim correction, if required, is introduced by rotating trim knob 49 to turn stator 48 of the roll synchro. The voltage induced in rotor 47 is added to the roll component from winding 25 of the synchro adapter and the resulting voltage amplified. The output of roll amplifier 51 controls armature current for a servomotor 52. The servomotor turns rotor 47 to its null position and also rotates the gimbal mounting 61 on which the pitch mechanism is mounted, thereby imparting a roll component to the attitude of the tip-path plane indicator bar 60. The indicator bar shows tip-path plane with respect to the horizon at all times.

Obviously many modifications and variations of the present invention are possible in the light of the above teachings. It is therefore to be understood that within the scope of the appended claims the invention may be practiced otherwise than as specifically described.

What is claimed is:

1. A tip-path plane indicating system for presenting a visual indication of the orientation in space of a plane passing through the tips of the rotating main rotor blades of a helicopter in flight, the system comprising pick-off synchro mechanically linked one to each blade of the rotor so as to detect angular movement of each blade in a plane intersecting the plane of rotation of the blade and to generate an electrical signal representing such movement, a slip-ring assembly for providing a continuous path from the rotating blades to the fuselage of the helicopter, an adapter for eliminating any portion of said electrical signal due to rotation of the blades, a gyroscope for providing further electrical signals which are added to said electrical signals to convert them to a horizon reference and servo mechanism controlled by the converted signals for positioning a tip-path plane indicator bar.

2. A tip-path plane indicating system for presenting a visual indication of the orientation in space of a plane passing through the tips of the rotating main rotor blades of a helicopter having three equally spaced full articulated, flapping blades, the system comprising three signal sensors mechanically linked one to each of said blades so that angular movement of any blade in a plane intersecting the plane of rotation of the rotor will generate an electrical signal in said sensor, said sensors being connected together in a delta configuration; a synchro adapter having a Y-connected rotor which is rotated at the same speed as the helicopter main rotor; said sensors being electrically connected to the adapter rotor in a delta-to-Y transition; a gyroscope for providing electrical signals which are added to the signals induced on the synchro adapter stator to convert the signals on the stator to a horizon reference; a tip-path plane indicator bar and a servo mechanism controlled by the converted signals to position said indicator bar.

3. The system described in claim 2 in which said signal sensors are synchros and the mechanical linkage from the sensors to the blades is such that angular movement of the blades causes rotation of the rotor of the associated synchro.

4. A tip-path plane indicating system for helicopters provided with at least three fully articulated rotors, sensor means directly connected with the means mounting each rotor for its articulation thereby deriving signals directly proportional to the tip-path plane attitude and further means for providing a visual indication of the tip-path plane attitude.

5. A tip-path plane indicating system as defined in claim 4 wherein said further means includes a synchro adapter for eliminating any signal imposed on said sensor means due to rotation of the blades.

6. A tip-path plane indicating system as defined in claim 5 wherein said further means also includes a gyroscope for providing signals and means adding said gyroscope produced signals to said sensor produced signals whereby the resultant signal will indicate the tip-path plane attitude with reference to the horizon.

7. In combination, a helicopter, a rotor drive shaft on said helicopter, means on said drive shaft mounting at least three rotor blades for full articulation, sensor means mounted adjacent said blade mounting means and linked thereto whereby said sensor means will produce an electrical signal proportional to the tip-path plane of said blades, means, including a means for applying a corrective signal to said proportional signal, for providing a visual indication the tip-path plane in relation to the horizon.

8. The combination of claim 7 wherein said means for applying a corrective signal comprises a gyroscope means mounted in said helicopter producing signals and means to add the gyroscope produced signals to the sensor produced signals.

References Cited in the file of this patent

UNITED STATES PATENTS

| | | |
|---|---|---|
| 2,567,212 | Klopp et al. | Sept. 11, 1951 |
| 2,636,161 | Hoover | Apr. 21, 1953 |